United States Patent
Tautz et al.

(10) Patent No.: US 8,839,942 B2
(45) Date of Patent: Sep. 23, 2014

(54) METHOD AND DEVICE FOR MONITORING THE FUNCTIONING OF AN ESCALATOR OR OF A MOVING WALKWAY

(71) Applicant: KONE Corporation, Helsinki (FI)

(72) Inventors: Andreas Tautz, Waltrop (DE); Rolf Carsten, Sprockhovel (DE); Christian Maletzki, Waltrop (DE)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 13/769,014

(22) Filed: Feb. 15, 2013

(65) Prior Publication Data

US 2013/0228417 A1  Sep. 5, 2013

(30) Foreign Application Priority Data

Feb. 17, 2012  (DE) .......................... 10 2012 003 178

(51) Int. Cl.
| | | |
|---|---|---|
| *B66B 29/00* | (2006.01) | |
| *B65G 43/04* | (2006.01) | |
| *B66B 25/00* | (2006.01) | |
| *B66B 23/02* | (2006.01) | |

(52) U.S. Cl.
CPC .............. *B65G 43/04* (2013.01); *B66B 25/003* (2013.01); *B66B 23/02* (2013.01); *B66B 29/005* (2013.01)
USPC ......................................................... 198/323

(58) Field of Classification Search
CPC ........ B66B 25/03; B66B 25/06; B66B 29/00; B66B 29/005
USPC ................................................... 198/322, 323
See application file for complete search history.

(56) References Cited

U.S. PATENT DOCUMENTS

| | | | |
|---|---|---|---|
| 5,361,887 A * | 11/1994 | Zaharia et al. ................. | 198/323 |
| 6,230,871 B1 * | 5/2001 | Balzer-Apke et al. ......... | 198/323 |
| 6,351,096 B1 * | 2/2002 | Jang .............................. | 318/811 |
| 6,666,319 B2 * | 12/2003 | Balzer-Apke et al. ......... | 198/323 |
| 6,758,319 B1 * | 7/2004 | Lange et al. ................... | 198/323 |
| 6,766,893 B2 * | 7/2004 | Neumann et al. .............. | 198/322 |
| 6,971,496 B1 * | 12/2005 | Nurnberg et al. .............. | 198/323 |
| 8,469,175 B2 * | 6/2013 | Lanzki et al. .................. | 198/322 |
| 2006/0006045 A1 * | 1/2006 | Stripling et al. ............... | 198/323 |
| 2012/0103756 A1 * | 5/2012 | Braasch et al. ................ | 198/323 |

FOREIGN PATENT DOCUMENTS

| | | |
|---|---|---|
| DE | 19849238 C1 | 3/2000 |
| DE | 10027490 A1 | 12/2000 |
| KR | 10-20000014497 | 3/2000 |
| WO | WO-2009/101148 A1 | 8/2009 |

* cited by examiner

*Primary Examiner* — Mark A Deuble
(74) *Attorney, Agent, or Firm* — Robert Kinberg

(57) ABSTRACT

A method and device for monitoring the functioning of a drive element provided between a drive motor and a pulling member for pallets or steps of a passenger transport installation is provided. The condition of the steps or pallets of the step or pallet belt may be monitored. The drive element may be monitored. The step or pallet belt may be stopped in the event of a malfunction of the drive element.

5 Claims, 3 Drawing Sheets

METHOD AND DEVICE FOR MONITORING THE FUNCTIONING OF AN ESCALATOR OR OF A MOVING WALKWAY

CROSS-REFERENCE TO RELATED APPLICATION

This application claims the priority of the German Patent Application No. 10 2012 003 178.5, filed on Feb. 17, 2012, the subject matter of which is incorporated herein by reference.

FIELD OF THE INVENTION

The invention relates to a method and a device for monitoring the functioning of a drive element provided between a drive motor and a pulling member for steps or pallets of a passenger transport installation.

BACKGROUND OF THE INVENTION

WO 2009/101148 A1 relates to an escalator or a moving walkway with two directions of travel comprising a step or pallet belt which is reversed in two reversing areas averted from each other. A device for monitoring the presence of steps or pallets of the step or pallet belt is provided, which device has at least one first detector provided for a detection function in the first direction of travel, and at least one second detector provided for the same detection function in the second direction of travel. The first and the second detector are in operative connection with an evaluation and control electronics unit which stops the drive of the escalator or of the moving walkway when missing steps or pallets are detected within the step or pallet belt. The evaluation and control electronics unit compares the signals of the first and second detector having an identical detection function for the different directions of travel in order to derive a signal for stopping the escalator or moving walkway therefrom.

DE 100 27 490 A1 discloses a safety device for escalators or moving walkways. The device is formed by at least one initiator operating in a non-contacting manner, which initiator is in operative connection with an evaluation and control electronics unit which stops the drive of the escalator or moving walkway when missing steps or pallets are detected within the step or pallet belt.

KR 10-20000014497 A discloses a monitoring device for an escalator. A motor, which can be triggered, and which is in operative connection with a transmission for moving a step belt, is monitored via a CPU.

DE 198 49 238 C1 discloses a method for shutting off passenger transport installations by monitoring functional units for malfunctions by means of control elements and combining them in the form of a signal to a safety chain. The signals of the functional units together with those from the drive monitoring unit are fed to at least one pre-control unit before the shut-off signal is fed to the shut-off contact of the drive or drives in dependence on the malfunction of the respective functional unit and/or drive monitoring unit.

It is generally known that drive motors are in immediate operative connection with transmission elements for driving a step or pallet belt, wherein the drive motor is often arranged between the reversing elements of the step or pallet belt.

It is also known that drive motors are positioned outside of the step or pallet belt, if required in connection with a transmission, and that the drive performance of the drive motor is transmitted to the step or pallet belt of the escalator or moving walkway via a drive means, for instance a chain or a belt.

SUMMARY OF THE INVENTION

Embodiments of the present invention relate to an escalator or moving walkway where the drive motor is provided outside of the step or pallet belt and is connected with reversing elements of the escalator or moving walkway via a drive means. The problem here is that in the event of damage to the drive means, there is no more control over the speed of the step or pallet belt.

Embodiments of the invention include a method and a device for monitoring the functioning of a drive element arranged between a drive motor and a pulling member or belt for steps or pallets of a passenger transport installation which stops or stop, respectively, the step or pallet belt of the escalator or moving walkway in any case within predeterminable temporary tolerances independent of damages of the drive element, so that personal injuries are avoided.

According to an embodiment of the invention, a method for monitoring the functioning of a drive element provided between a drive motor and a pulling member for pallets or steps of a passenger transport installation may be provided, wherein the condition of the steps or pallets of the step or pallet belt on the one hand and the drive element on the other hand is monitored, and the step or pallet belt is stopped in the event of a malfunction of the drive element.

According to another embodiment, a device for monitoring the functioning of a drive element provided between a drive motor and a pulling member for steps or pallets of a passenger transport installation may be provided. The device may comprise monitoring means for the drive motor and monitoring means for the detection of missing steps or pallets of the passenger transport installation. The frequency of the drive motor and the pulse sequence of the detected steps or pallets, respectively, are measurable and comparable. When the frequency of the drive motor and the frequency of the pulse sequence of the steps or pallets deviate from predetermined values, at least one brake provided in the area of the step or pallet belt reduces the speed of the step or pallet belt towards zero.

The monitoring elements for the detection of missing steps or pallets may be formed by sensors which, independent of the direction of travel, are arranged in the return strand of the step or pallet belt in such a way that they are orientated to a step or pallet roller of the steps or pallets provided at a predetermined distance from each other. Each pulse is defined in dependence on the travelling speed of the escalator or moving walkway and the distance between two step or pallet rollers.

As already mentioned, the drive element may be formed by a belt or a chain. In an embodiment of the invention, at least one chain formed as a drive element may extend between the drive element of the drive motor and components of the reversing elements of the step or pallet belt.

In addition, the frequency of the drive motor and the pulses from the missing step or pallet monitoring unit may be fed to an evaluation device within which the frequency patterns are compared. The brake of the step or pallet belt formed in particular as a mechanical emergency brake can be activated by the evaluation unit in the event that a deviation from predetermined tolerance values occurs.

The monitoring method for the drive means which has been used up to now but which does not work optimally may continue to be provided. For this purpose, a mechanical sensor may be used.

BRIEF DESCRIPTION OF THE DRAWINGS

The subject matter of the invention is illustrated on the basis of an exemplary embodiment in the drawing and is described as follows: In these drawings.

DETAILED DESCRIPTION OF THE PREFERRED EMBODIMENT

Figure 1:
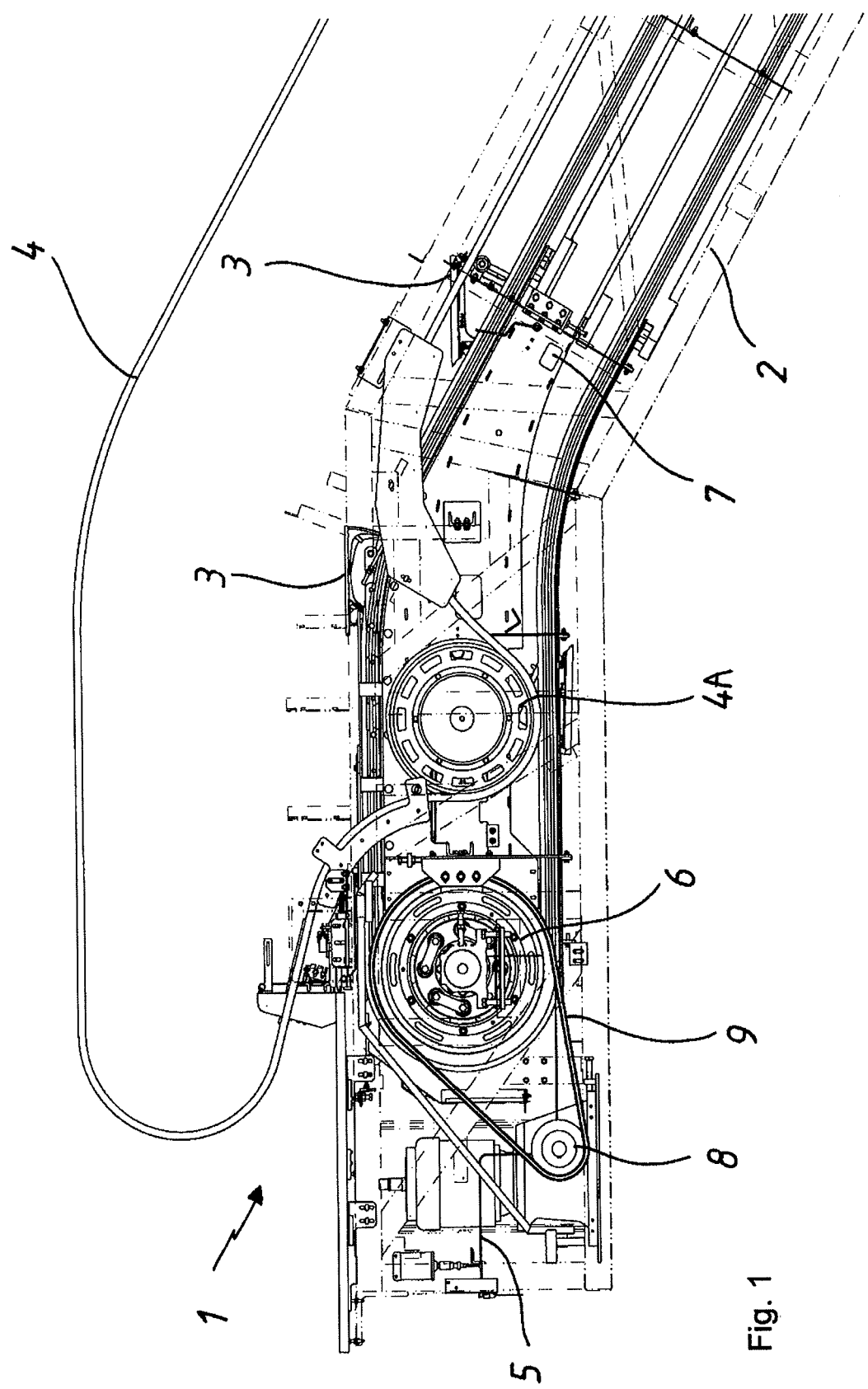
FIG. 1 shows a schematic diagram of an upper part of an escalator.

FIG. 1 shows part of an escalator 1 as a schematic diagram according to an embodiment of the invention. The escalator 1 may include: a frame 2, steps 3 of a pulling member or step belt not shown in detail, a handrail 4, an electric drive motor 5, a reversing element 6 for the steps 3, a reversing element 4A for handrail 4, a sensor 7 formed as a missing step sensor for possibly missing steps 3. The drive motor 5 is positioned outside of the reversing area for the step. The drive motor 5 has an output element 8. A drive element 9 in the form of a chain extends between the components of the reversing element 6 and the output element 8.

Figure 2:
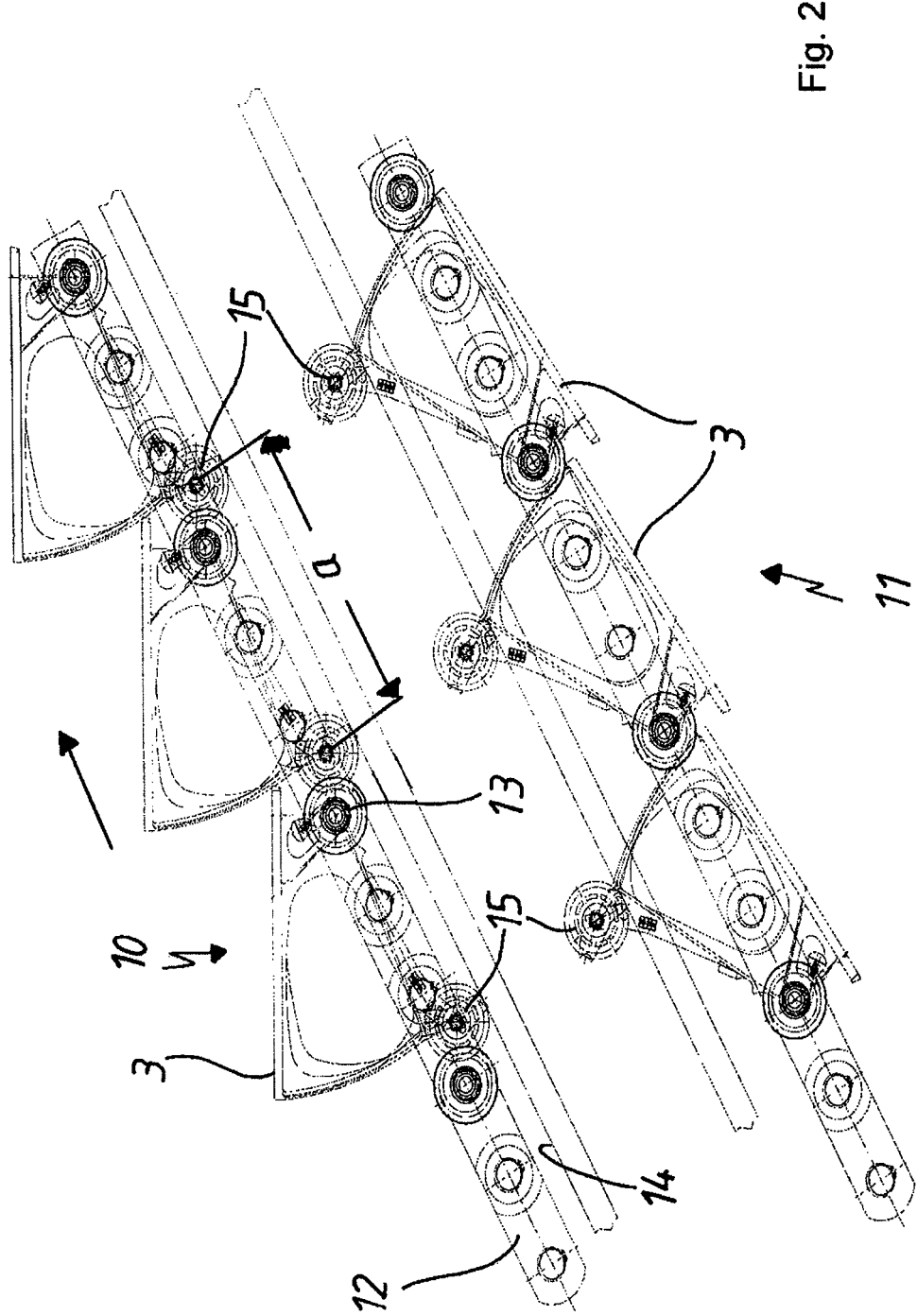
FIG. 2 shows a schematic diagram of an only outlined transport and return strand of the escalator pursuant to FIG. 1.

FIG. 2 shows as a schematic diagram an only outlined transport strand 10 and an also only outlined return strand 11 of the escalator 1 pursuant to FIG. 1 according to an embodiment. Each step 3 has a chain roller 13 which is in operative connection with a pulling member 12 and a step roller 15 rolling on a guideway 14.

The sensor 7 shown in FIG. 1, but not visible here, is orientated to step roller 15 of the steps 3. The distance a of the step rollers 15 of steps 3 arranged in series is defined (e.g. 400 mm) and is the same throughout the step belt.

The sensor 7 always measures the invariable distance a of individual step rollers 15 in dependence on the travel speed of the escalator, thereby generating pulses. In the event that the pulse generated by a defined temporary value is no longer correct, there are grounds for supposing that a step 3 is missing. After the missing step has been detected, the drive 5 of escalator 1 is immediately stopped.

The weak point in the escalator presented here is the drive element 9 formed as a chain. In the event that it should have broken or jumped off the output element 8, there is no more relation between the drive motor 5 and the step belt of escalator 1.

According to an embodiment of the invention, a relation between measurable values of drive motor 5 and sensor 7 may be created.

The drive motor 5 may generate pulses from the speed/frequency. In an evaluation unit which is not shown herein, the measured pulses of drive motor 5 and of sensor 7 can be combined and compared with each other. If certain proportions are maintained, it can be assumed that the drive element 9 fulfils its function. If these proportions are no longer maintained, it suggests that there may be problems with drive element 9, and a mechanical emergency brake which is not shown in detail herein may stop the step belt within a predetermined time interval.

Figure 3:
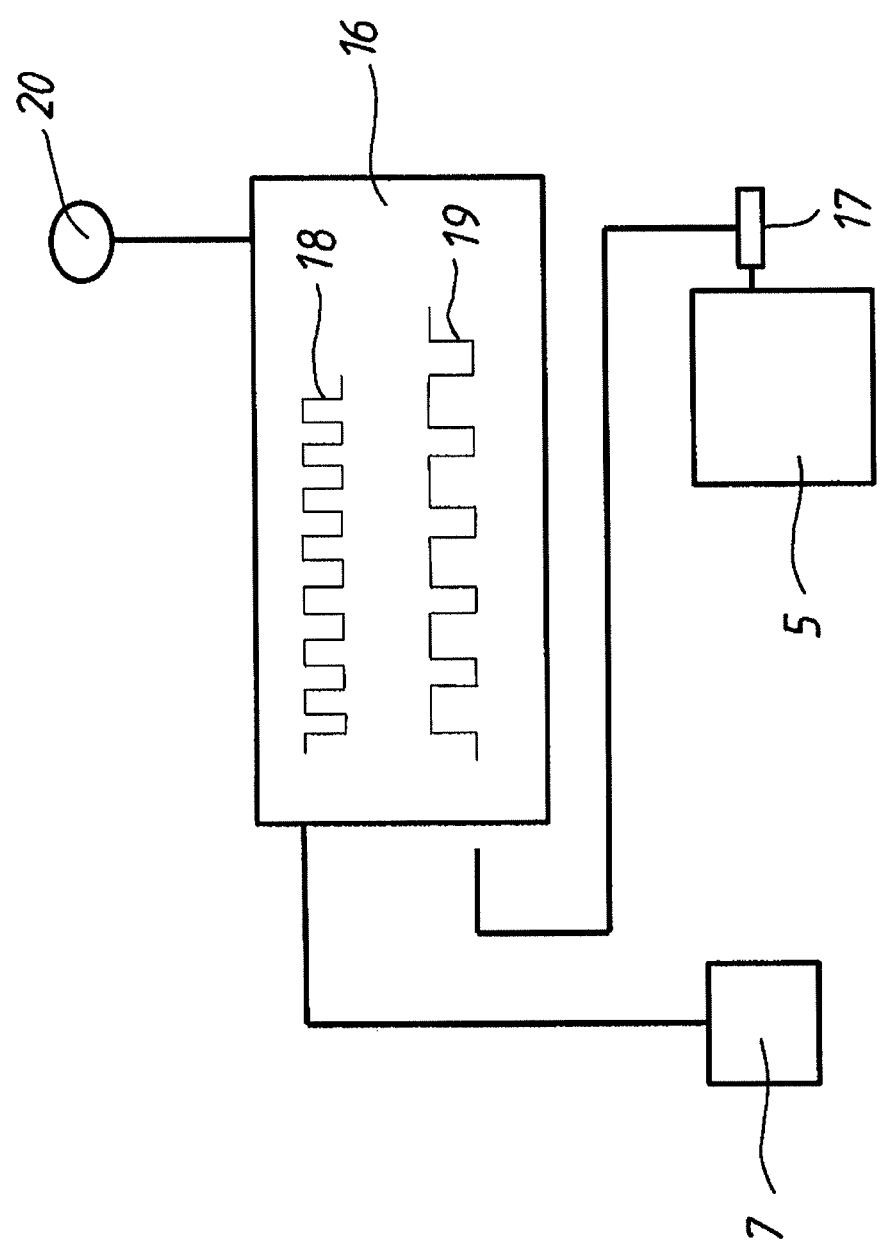
FIG. 3 shows a schematic diagram of the monitoring method.

FIG. 3 shows as a schematic diagram how drive element 9 is monitored according to an embodiment of the invention. What can be recognised are the sensor 7, the drive motor 5, and an evaluation unit 16. The pulses measured by sensor 7, as well as the pulses measured e. g. by a speed sensor 17 on the drive motor 5, are fed to evaluation unit 16. The pulses 18, 19 generated in the evaluation unit 16 are put into a certain proportion and form a basic pattern. Deviations from this basic pattern lead to an activation of an only outlined brake 20 via evaluation unit 16, which brake is provided in the area of the step belt, and the step belt is braked.

The invention claimed is:

1. A method for monitoring the functioning of a drive element provided between a drive motor and a belt for pallets or steps of a passenger transport installation, comprising:
   monitoring a condition of the steps or pallets of the step or pallet belt by a missing step or missing pallet monitoring device provided in the area of the step or pallet belt, wherein a distance between individual steps or pallets is measured by determining a pulse sequence of the steps or pallets;
   measuring a frequency of the drive motor;
   comparing the measured pulse sequence of the steps or pallets and the measured frequency of the drive motor with a predetermined frequency range; and
   in the event that the measured values deviate outside of the predetermined frequency range indicating a malfunction of the drive element, stopping the step or pallet belt by a brake provided in the area of the step or pallet belt.

2. A device for monitoring the functioning of a drive element provided between a drive motor and a belt for steps or pallets of a passenger transport installation, comprising
   monitoring means for the drive motor;
   monitoring elements for detecting missing steps or pallets of the passenger transport installation, wherein the frequency of the drive motor and the pulse sequence of the detected steps or pallets, respectively, are measurable and comparable, and wherein, when the frequency of the drive motor and the frequency of the pulse sequence of the steps or pallets deviate from predetermined values, at least one brake provided in the area of the step or pallet belt reduces the speed of the step or pallet belt towards zero; and
   an evaluation device, wherein the evaluation device is configured and arranged to receive the frequency of the drive motor and the pulses from the missing step or pallet monitoring unit, wherein the evaluation unit is configured to compare the frequency patterns, and wherein the evaluation unit is configured to activated the brake of the step or pallet belt in the event that a deviation from predetermined tolerance values occurs.

3. A device according to claim 2, wherein the drive element comprises at least one chain which extends between an output element of the drive motor and a reversing element of the step or pallet belt.

4. A device according to claim 2, wherein the monitoring means for the drive motor comprises a speed sensor positioned in the area of the drive motor.

5. A device for monitoring the functioning of a drive element provided between a drive motor and a belt for steps or pallets of a passenger transport installation, comprising
   monitoring means for the drive motor;
   monitoring elements for detecting missing steps or pallets of the passenger transport installation, therein the frequency of the drive motor and the pulse sequence of the detected steps or pallets, respectively, are measurable and comparable, and wherein, when the frequency of the drive motor and the frequency of the pulse sequence of the steps or pallets deviate from predetermined values, at least one brake provided in the area of the step or pallet belt reduces the speed of the step or pallet belt towards zero, wherein the monitoring elements for the detection of missing steps or pallets comprise sensors which, independent of the direction of travel, are arranged in the return strand of the step or pallet belt and orientated to a step or pallet roller of the steps or pallets provided at a predetermined distance from each other, wherein each pulse is generated in dependence on the travelling speed of the escalator or moving walkway and a distance between two step or pallet rollers.

* * * * *